(12) United States Patent
Satake

(10) Patent No.: US 7,906,923 B2
(45) Date of Patent: Mar. 15, 2011

(54) CONTROL APPARATUS FOR RELUCTANCE TYPE SYNCHRONOUS MOTOR

(75) Inventor: Akiyoshi Satake, Aichi (JP)

(73) Assignee: Okuma Corporation, Niwa-Gun, Aichi (JP)

( * ) Notice: Subject to any disclaimer, the term of this patent is extended or adjusted under 35 U.S.C. 154(b) by 374 days.

(21) Appl. No.: 12/180,258

(22) Filed: Jul. 25, 2008

(65) Prior Publication Data

US 2009/0026997 A1    Jan. 29, 2009

(30) Foreign Application Priority Data

Jul. 27, 2007   (JP) ................. 2007-195498

(51) Int. Cl.
*H02P 21/00* (2006.01)
(52) U.S. Cl. .................. 318/400.02; 318/701
(58) Field of Classification Search ............ 318/400.02, 318/701, 727, 432, 434, 461
See application file for complete search history.

(56) References Cited

U.S. PATENT DOCUMENTS

| 5,936,378 A * | 8/1999 | Iijima et al. ................. 318/807 |
| 6,208,108 B1 * | 3/2001 | Nashiki et al. .............. 318/701 |
| 2002/0180398 A1 * | 12/2002 | Nakatsugawa et al. ....... 318/700 |

FOREIGN PATENT DOCUMENTS

JP   11356078   12/1999

OTHER PUBLICATIONS esp@cenet patent abstract for Japanese Publication No. 11356078, Publication date Dec. 24, 1999 (1 page).

* cited by examiner

*Primary Examiner* — Rina I Duda
(74) *Attorney, Agent, or Firm* — Osha • Liang LLP

(57) ABSTRACT

A control apparatus for a reluctance type synchronous motor wherein slit-shaped gaps or a nonmagnetic material are included within a rotor to provide level differences of the magnetic reluctance in a rotating direction, and a permanent magnet is included at a portion of the slit-shaped gaps or the nonmagnetic material to provide magnetic polarities at a rotor surface. The control apparatus includes a q-axis current calculation unit, a d-axis current calculation unit, a speed coefficient calculation unit, a q-axis current compensation value calculation unit, and an output unit which outputs a compensated q-axis current command value in which the calculated q-axis current compensation value is added to the q-axis current command value.

5 Claims, 10 Drawing Sheets

CONTROL APPARATUS FOR RELUCTANCE TYPE SYNCHRONOUS MOTOR

CROSS-REFERENCE TO RELATED APPLICATIONS

This application claims priority to Japanese Patent Application No. 2007-195498, filed on Jul. 27, 2007, which is incorporated herein by reference in its entirety.

BACKGROUND

1. Field of the Invention

The present invention relates to a control apparatus for an electric motor which uses a reluctance torque primarily and utilizes a magnet torque secondarily (in an auxiliary manner) and which is applied to a machine tool or the like, and more particularly to a control apparatus for a reluctance type synchronous motor in which, in order to compensate for nonlinear characteristics of the actual torque of the motor arising relative to a torque command value, a q-axis current command value is compensated for by a compensation value calculated on the basis of a d-axis current command value and a rotor speed.

2. Related Art

There have hitherto been known a control apparatus and a control method for a reluctance type synchronous motor (hereinbelow, simply termed the "motor"), wherein the magnitude of a field current such as d-axis current is changed in proportion to a torque command value as in JP-A-11-356078. FIG. 10 shows a control block diagram of such a motor applied to the feed shaft control or spindle of a general machine tool, and it illustrates a configuration similar to that of a torque-current conversion section in JP-A-11-356078. Especially, a portion which calculates a q-axis current command value and a d-axis current command value from a torque command value in a general d-q axis vector control is omitted for clarity of description. Next, the flow of processing will be explained. The torque command value STC is input from a host controller, not shown, to a q-axis current calculation unit 1, whereby a q-axis current amplitude value SIQC is calculated. A q-axis current coefficient SKIQ is calculated by a q-axis current coefficient calculation unit 4 in accordance with a rotor speed SPD, and the q-axis current amplitude value SIQC and the q-axis current coefficient SKIQ are multiplied by a multiplication unit 5, to thereby generate the q-axis current command value SIQCC. Here, the q-axis current command value SIQCC agrees in sign with the torque command value. The torque command value STC is then input to a d-axis current calculation unit 2, whereby a d-axis current amplitude value SIDC is calculated. A d-axis current coefficient SKID is calculated by a d-axis current coefficient calculation unit 3 in accordance with the rotor speed SPD, and the d-axis current amplitude value SIDC and the d-axis current coefficient SKID are multiplied by a multiplication unit 6, to thereby generate the d-axis current command value SIDCC.

FIGS. 7(a), 7(b) and 7(c) show functional examples of the d-axis current coefficient, the q-axis current coefficient, and a q-axis compensation current coefficient, respectively, as applied to a control apparatus for a motor. As shown in FIGS. 7(a) and 7(b), the q-axis current coefficient SKIQ and the d-axis current coefficient SKID normally become "1" when the rotor speed SPD is below a basic rotation speeds the SPDB, and become larger or smaller than "1" when the rotor speed SPD is equal to or greater than the basic rotation number SPDB. However, they sometimes become "1" at or above the basic rotation number SPDB, depending upon the characteristics of the motor.

SUMMARY OF THE INVENTION

In general, a reluctance type motor (RM) which uses only a reluctance torque, or an interior permanent magnet type motor (IPM) which utilizes the reluctance torque and a magnet torque requires, in principle, the control of a d-axis current corresponding to the permanent magnet field of a permanent magnet type motor. The control is commonly performed by vector control. As is known, the generation of a reluctance force is based on the difference between the magnetic reluctances (=inductances) of a d-axis and a q-axis within a rotor. Accordingly, the contrivance of providing slit-shaped gaps within the rotor or interposing a nonmagnetic material therein is required in order to create a magnetic reluctance difference. Such a structure, however, is disadvantageous that the rotor's strength against a centrifugal force is reduced. In order to heighten the strength of the rotor, therefore, a method for increasing the strength is adopted by providing a magnetic bridge portion outside the rotor or at the slit-shaped gap parts.

In some cases a rotor structure is configured so as not to form the magnetic bridge portion, and the entire rotor is subjected to a molding process or the external reinforcement of the rotor is performed by an annular nonmagnetic member. However, a gap is always present between a stator and the rotor, and, in motors which produce torque by utilizing the magnetic reluctance difference, there is always a loss in the magnetic energy transmissions of the magnetic bridge portion at the outer periphery of the rotor and the gap between the stator and the rotor. Moreover, the B-H (flux density-magnetizing force) characteristic of a soft magnetic substance forming a magnetic path has a property such that, in a region where a current is small (H is small), the change rate of the flux density relative the change of the current is large, and a stable magnetic flux cannot be obtained. Accordingly, a torque constant tends to grow small, especially when the current is small.

FIG. 4(a) shows values for torques generated for individual applied currents plotted against a rotor angle ORE when DC currents are applied. The illustrated characteristic is referred to as the "rotation angle θ-torque τ characteristic". In a case wherein the control method of the prior-art technique described above is performed, a control angle θ always becomes θ1, and torques along line 42 are obtained for the respective currents. A torque which is obtained for a synthetic current (applied DC current and q-axis current) SIO at that time becomes as shown by line 44 in FIG. 4(b), and the torque which is obtained for the current SIO becomes nonlinear. The torque constant becomes especially small as noted above in a region where the synthetic current SIO is below SIO1, and the linearity of the torque obtained for the synthetic current SIO decreases. From the viewpoint of control, when the gain of a host loop is raised in the region of the small torque constant, the motor being a controlled system oscillates, leading to the disadvantage that the gain cannot be steadily raised and that a stable control cannot be attained.

The present invention was conceived in view of the above circumstances, and advantageously provides a control apparatus which can be provided for a torque command value STC in a motor utilizing a reluctance torque and a permanent magnet torque, and in which the gain of a host loop can be raised to perform more stable control.

In order to accomplish such an object, a control apparatus for a reluctance type synchronous motor according to the invention consists of a control apparatus for a reluctance type synchronous motor wherein either or both of a slit-shaped gap or a nonmagnetic material are included within a rotor, thereby to have level differences of magnetic reluctance in a rotating direction, and a permanent magnet is provided at some portion of the slit-shaped gap or nonmagnetic material such as to provide magnetic polarities at a rotor surface, characterized by including a q-axis current calculation unit which calculates a q-axis current amplitude value that is proportional to a torque command value given by a host controller; a d-axis current calculation unit which calculates a d-axis current amplitude value that is proportional to the torque command value; a speed coefficient calculation unit which calculates a q-axis current coefficient and a d-axis current coefficient that change in accordance with a rotor speed; a q-axis current compensation value calculation unit which calculates a q-axis current command value and a d-axis current command value by multiplying the q-axis current amplitude value and the q-axis current coefficient, and the d-axis current amplitude value and the d-axis current coefficient, respectively, and which calculates a q-axis current compensation value in conformity with a triangular compensation function or a trapezoidal compensation function based on the d-axis current command value; and an output unit which outputs a compensated q-axis current command value in which the calculated q-axis current compensation value is added to the q-axis current command value.

A control apparatus for a reluctance type synchronous motor according to the invention is further characterized in that the triangular compensation function is a function of a magnitude of the d-axis current command value (an absolute value), in which the q-axis current compensation value increases in case of 0<|the d-axis current command value|≦a first threshold value, while the q-axis current compensation value decreases when {the first threshold value<|the d-axis current command value|≦a second threshold value}, and in which the threshold values are set such that 0<the first threshold value<the second threshold value.

Another control apparatus for a reluctance type synchronous motor according to the present invention is characterized in that the trapezoidal compensation function is a function of a magnitude of the d-axis current command value (an absolute value), in which the q-axis current compensation value increases when {0<|the d-axis current command value|≦a first threshold value}; the q-axis current compensation value is constant when {the first threshold value<|the d-axis current command value|≦a second threshold value}; and the q-axis current compensation value decreases when {the second threshold value<|the d-axis current command value|≦a third threshold value}, and in which the threshold values are set such that 0<the first threshold value<the second threshold value<the third threshold value.

A further control apparatus for a reluctance type synchronous motor according to the present invention is characterized in that the q-axis current compensation value is calculated by multiplying the q-axis current compensation value and an increase/decrease coefficient which is calculated by an increase/decrease coefficient calculation unit with reference to the rotor speed, at a basic rotation number or above.

In addition, a further control apparatus for a reluctance type synchronous motor according to the invention is characterized in that the q-axis compensation current value changes the threshold value of the magnitude of the d-axis current command value (the absolute value) by multiplying a coefficient which is calculated in accordance with the rotor speed.

Another control apparatus for a reluctance type synchronous motor according to the invention includes a q-axis current calculation unit which calculates a q-axis current amplitude value that is proportional to a torque command value given by a host controller; a d-axis current calculation unit which calculates a d-axis current amplitude value that is proportional to the torque command value; a speed coefficient calculation unit which calculates a q-axis current coefficient and a d-axis current coefficient that change in accordance with a rotor speed; a q-axis current compensation value calculation unit which calculates a q-axis current command value and a d-axis current command value by multiplying the q-axis current amplitude value and the q-axis current coefficient, and the d-axis current amplitude value and the d-axis current coefficient, respectively, and which calculates a q-axis current compensation value in conformity with a triangular compensation function or a trapezoidal compensation function based on the d-axis current command value; and an output unit which outputs a compensated q-axis current command value in which the calculated q-axis current compensation value is added to the q-axis current command value. Thus, when the present invention is applied, the q-axis current command can be compensated for, and a nonlinear current-torque characteristic ascribable to the magnetic structure of a motor rotor and the magnetic characteristic of the material thereof can be improved. It is therefore possible to obtain a torque proportional to the torque command value, and to realize a motor control apparatus which provides stable controllability.

EMBODIMENTS

Next, the best mode for carrying out the present invention will be described with reference to the drawings. Except where otherwise specified, constituents, signals, and the like designated by the same signs and numerals used in previous description shall have the same function and perform in a similar manner.

Figure 1:
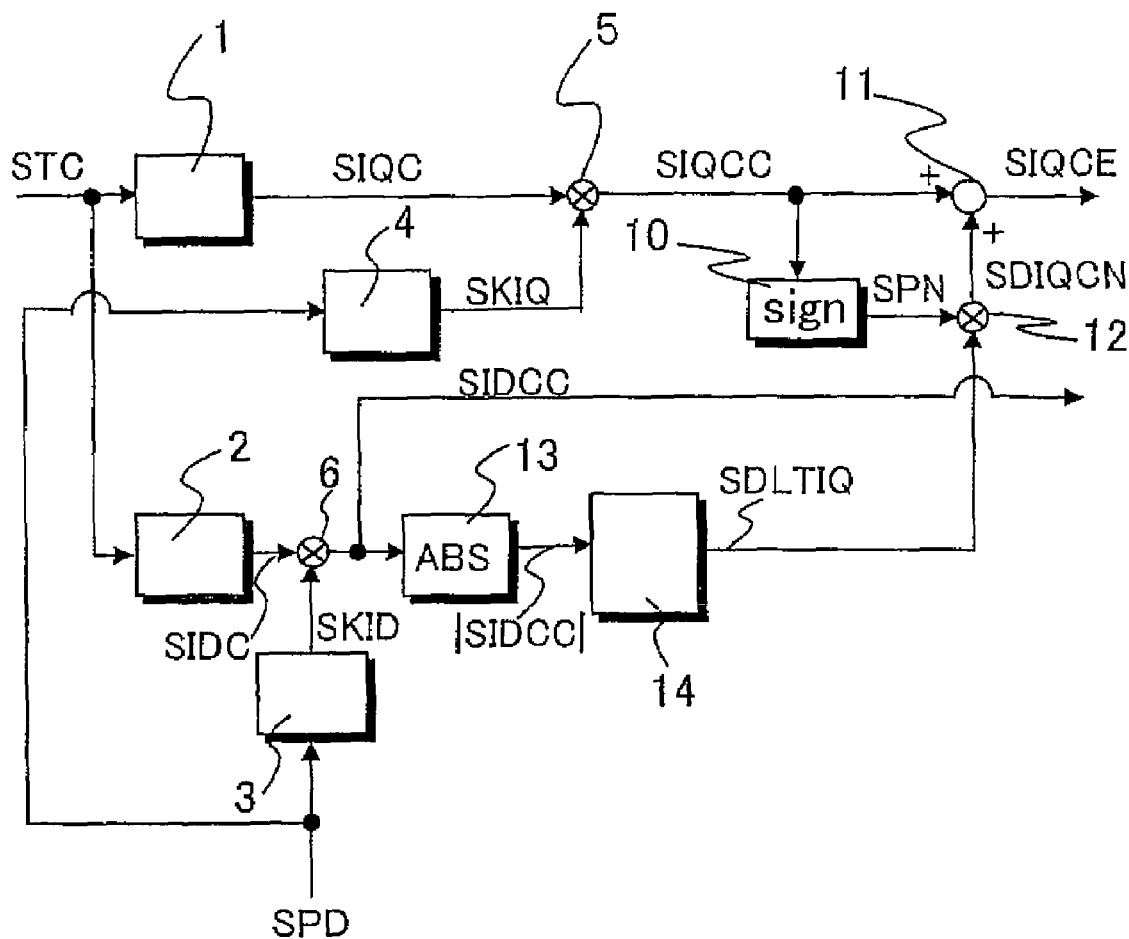
FIG. 1 is an explanatory diagram showing an embodiment of a control apparatus for a motor according to the present invention.
Figure 10:
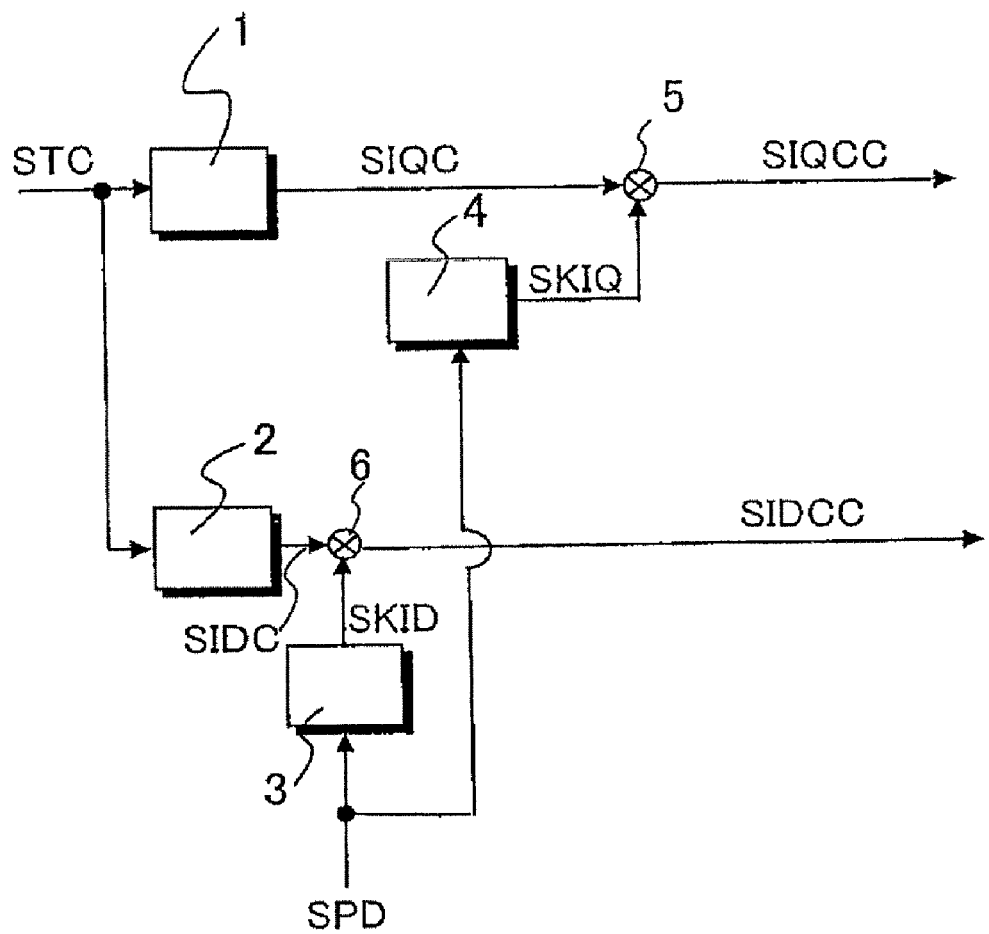
FIG. 10 is an explanatory diagram showing an example of a motor control apparatus according to a related art.

FIG. 1 shows an example embodiment of the present invention. As the q-axis current calculation unit 1, d-axis current calculation unit 2, q-axis current coefficient calculation unit 4 and d-axis current coefficient calculation unit 3 are equivalent in function to those of the related art technique illustrated in FIG. 10, and as the methods for calculating a q-axis current command value SIQCC and a d-axis current command value SIDCC are the same as in the related art technique, their description shall not be repeated. The d-axis current command value SIDCC is turned into an absolute value by an absolute value calculation unit 13, and the d-axis current command value (absolute value) |SIDCC| is input to a q-axis compensation current calculation unit 14. The q-axis compensation current calculation unit 14 outputs to a multiplication unit 12 a q-axis current compensation value SDLTIQ based on the d-axis current command value (absolute value) |SIDCC|. A sign decision unit 10 outputs to the multiplication unit 12 a sign SPN ("1" for plus, and "−1" for minus) determined in accordance with the polarity of the q-axis current command value SIQCC by referring to this q-axis current command value SIQCC. In the multiplication unit 12, the q-axis current compensation value SDLTIQ and the sign SPN are multiplied to generate a q-axis current compensation value SDIQCN (with a polarity). In an addition unit 11, the q-axis current compensation value SDIQCN is added with the q-axis current command value SIQCC, thereby to become a compensated q-axis current command value SIQCE.

Figure 2:
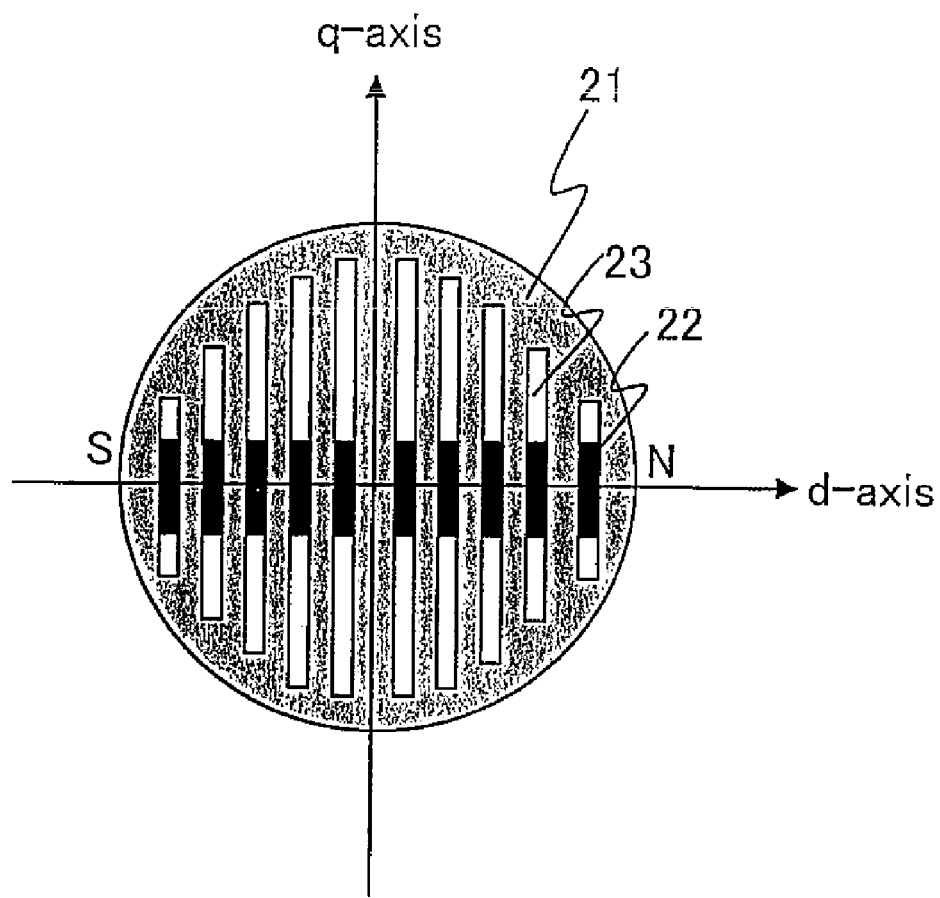
FIG. 2 is a model diagram of an example of the motor to which the control apparatus is applied.

FIG. 2 shows an example of the rotor of a motor to which the invention is applied. As shown in FIG. 2, a small amount of permanent magnet is used for the rotor of the motor for obtaining a reluctance torque, such that a permanent magnet torque, namely, a Lorentz force, can be obtained. Although a motor with two poles shall hereafter be described for simplicity of description, any motor having 2n poles (where n denotes an integer) has the same principle. The rotor 21 is made of a soft magnetic material such as silicon steel plate, and has a structure in which a nonmagnetic material or slit-shaped gaps 23 are provided in order to establish the level differences of a magnetic reluctance in the soft magnetic material.

A feature of the motor to which the present invention is applied is that the permanent magnet 22 is included within part of the nonmagnetic material or slit-shaped gaps 23, whereby a magnetic polarity (N-pole or S-pole) emanates from the surface of the rotor 21. For the sake of description, the direction in which the polarity (N-pole) of the main magnetic flux of the permanent magnet emanates is defined as a d-axis, while an axis perpendicular to the d-axis is defined as a q-axis. In the motor shown in FIG. 2, when the inductances of the d-axis and the q-axis are set to values "Ld" and "Lq", respectively, then, although not illustrated, the motor has the characteristics that Ld<Lq, that the d-axis inductance Ld becomes a substantially constant value, and that the q-axis inductance Lq changes greatly versus a d-axis current value.

Figure 3:
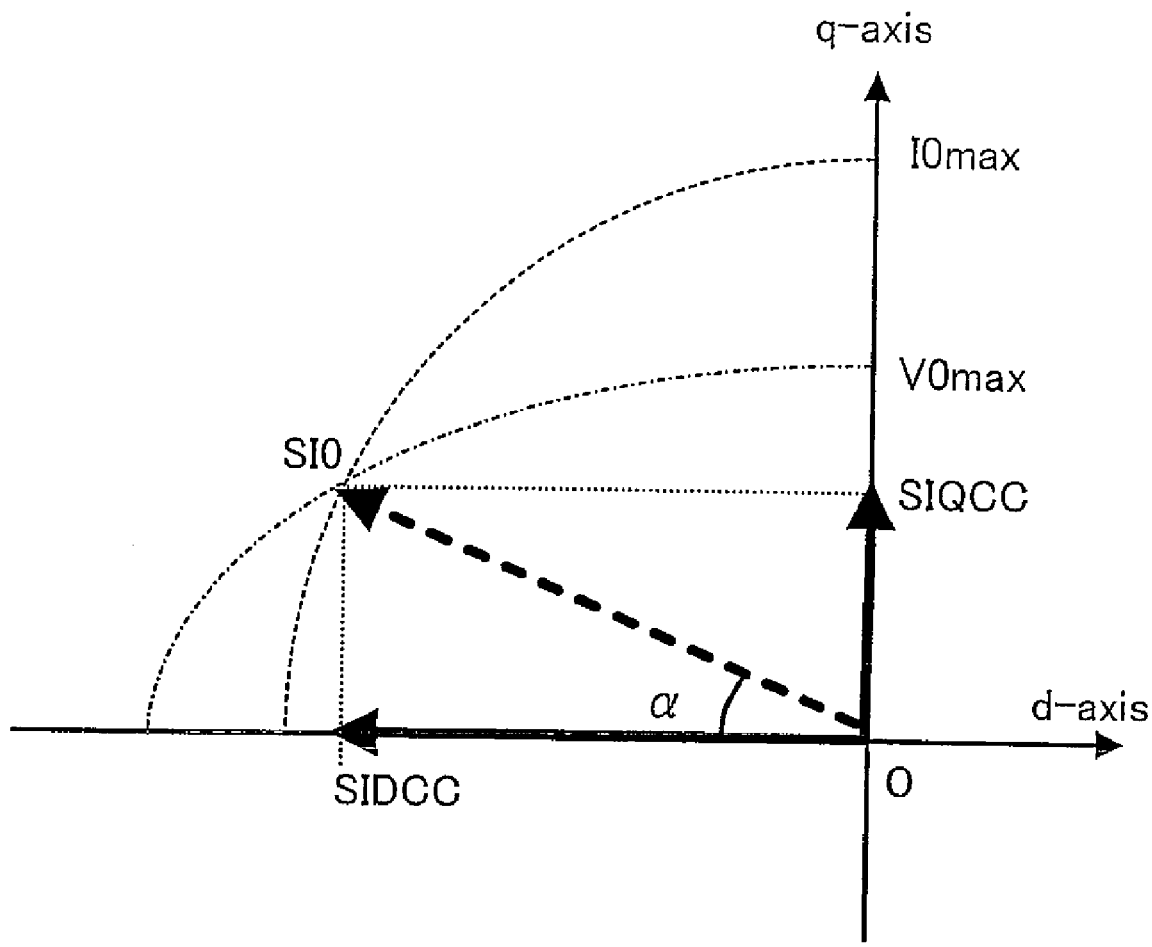
FIG. 3 is a vector diagram of an example d-q axis current in the control apparatus.

FIG. 3 exemplifies a d-q axis current vectorial diagram of a control apparatus for the motor to which the invention is applied. "IOmax" indicates a current limitation circle which is determined by the drive amplifier used, while "VOmax" indicates a voltage limitation ellipse which is determined by a supply voltage. The command value of a current which is applied to the motor, that is, a d-axis current command, a q-axis current command or a synthetic current command SIO is vector-controlled within the set parameters. When a rotor speed SPD is below a basic rotation number SPDB, the q-axis current command value SIQCC and the d-axis current command value SIDCC are as shown in the vector diagram of FIG. 3, and the synthetic value of the q-axis current command value SIQCC and the d-axis current command value SIDCC becomes the synthetic current SIO. When this occurs, the relationships torque command value STC∝q-axis current command value SIQCC and torque command value STC∝d-axis current command value SIDCC hold. Therefore, when a control angle α is defined between the synthetic current SIO and the d-axis current command value SIDCC, this control angle α becomes a constant value, irrespective of the magnitude of the torque command value STC.

Figure 4A:
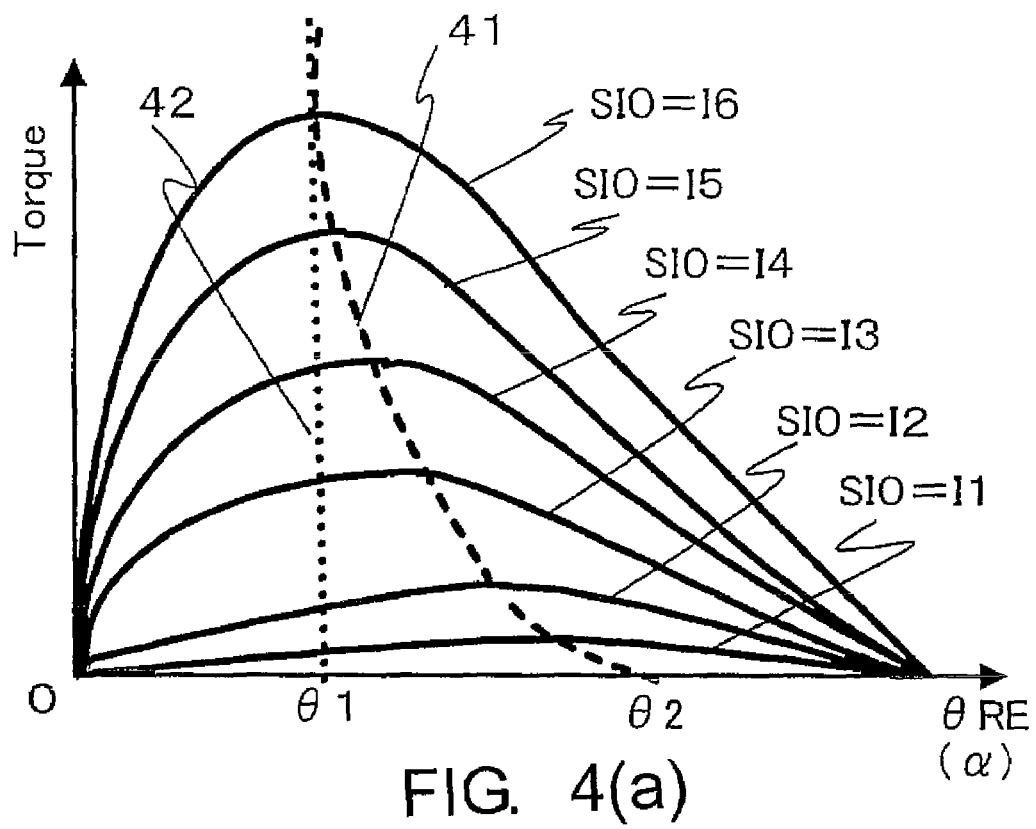
FIGS. 4(a) and 4(b) are explanatory diagrams showing torque characteristics for example individual currents, versus the rotation angle (electrical angle) of the motor, and a torque versus a current as are applied to the control apparatus, respectively.
Figure 4B:
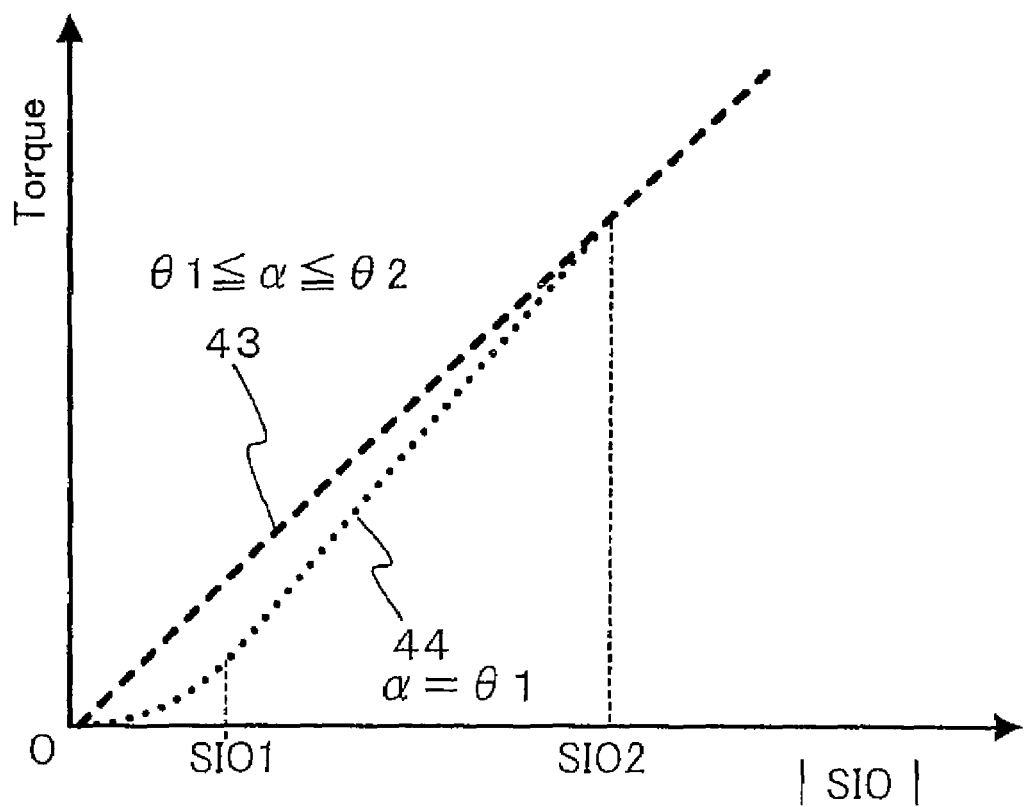

FIG. 4(a) shows torques which are generated for individual applied currents versus the changes of a rotor angle θRE, in an example wherein the DC currents of the motor to be handled in the invention are applied (for example, from a U-phase to V- and W-phases). When control is applied such that the control angle θRE (α) is held constant at θ1, torque values along line 42 are obtained. A torque which is obtained for the synthetic current SIO of the q-axis current and the d-axis current at that time becomes as shown by line 44 in FIG. 4(b), from which it can be seen that the torque which is obtained for the synthetic current SIO becomes nonlinear. Especially in a region wherein the synthetic current SIO is below SIO1, the torque constant becomes small as stated above, and the linearity of the torque obtained for the synthetic current SIO decreases. In contrast, when the control apparatus of the invention is applied, the control angle θRE (α) changes in the range from θ1 to θ2 as indicated in FIG. 4(a), in accordance with the current value SIO, such that the linearity of the torque to the current (a line 43) is enhanced. It should be noted that in a region on the line 44 in FIG. 4(b) where the synthetic current SIO is SIO2 or above, the torque constant decreases. This is a phenomenon which occurs because the inductance of the q-axis becomes saturated. In consideration of the influence of the saturation of the q-axis inductance, the present invention includes the feature that the q-axis current compensation value can be zeroized when it exceeds a desired d-axis current value.

Figure 5A:
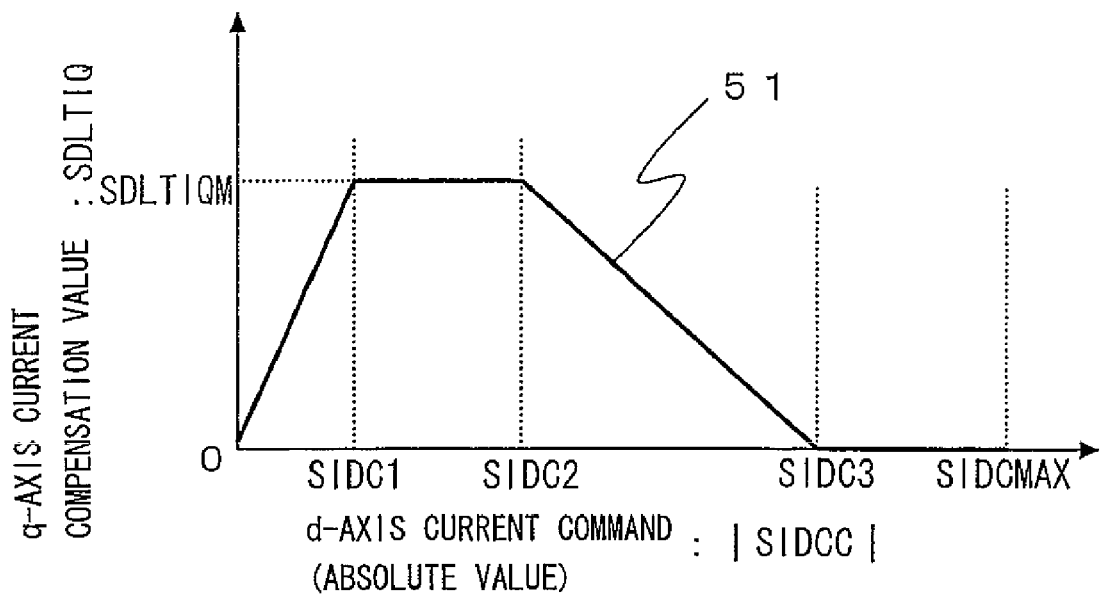
FIGS. 5(a) and 5(b) are explanatory diagrams showing an example of a q-axis compensation current, and a d-axis current command value, the q-axis compensation current and a control angle as are applied to the control apparatus, respectively.
Figure 5B:
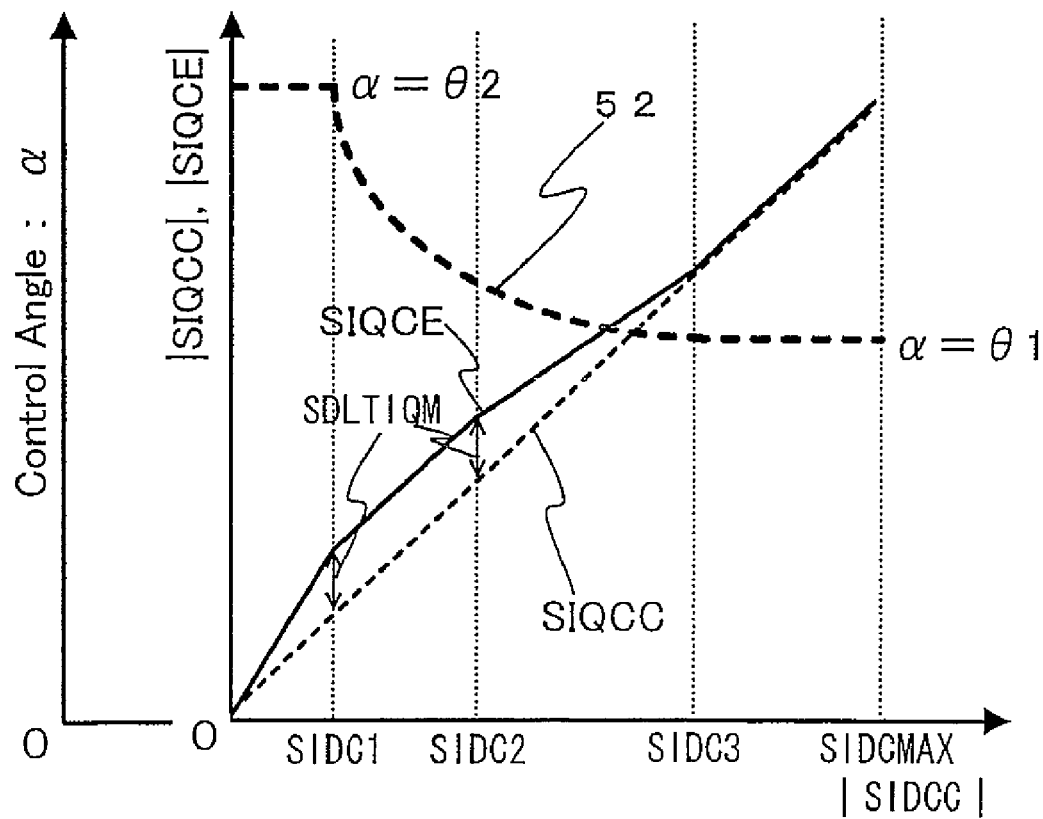

FIGS. 5(a) and 5(b) show an example embodiment of the present invention. FIG. 5(a) shows the q-axis current compensation value versus the d-axis current command value. That is, FIG. 5(a) shows a function example of the q-axis current compensation value SDLTIQ versus the d-axis current command (absolute value) |SIDCC|. The q-axis current compensation value SDLTIQ increases from zero to a compensation maximum value SDLTIQM for an interval of $0 \leq |SIDCC| \leq SIDC1$ at a line 51 in FIG. 5(a); is held constant at the compensation maximum value SDLTIQM for an interval of $SIDC1 \leq |SIDCC| \leq SIDC2$; decreases from the compensation maximum value SDLTIQM to zero for an interval of $SIDC2 \leq |SIDCC| \leq SIDC3$; and becomes zero for an interval of $SIDC3 \leq |SIDCC| \leq SIDCMAX$.

As different examples of the setting technique, the interval in which the q-axis current compensation value SDLTIQ=SDLTIQM (constant value) holds can be eliminated by setting SIDC1=SIDC2, and the interval in which the q-axis current compensation value SDLTIQ=0 (constant) can be eliminated by setting SIDC3=SIDCMAX.

FIG. 5(b) exemplifies the q-axis current command value |SIQCC| and the compensated q-axis current command value |SIQCE| versus the d-axis current command value (absolute value) |SIDCC| and the control angle α when the q-axis current has been compensated for. Here, the illustration corresponds to a an example wherein the rotor speed |SPD| is below the basic rotation number. The q-axis current command |SIQCC| before the compensation changes rectilinearly to the d-axis current command value (absolute value) |SIDCC|, while, although not illustrated, the control angle becomes α=θ1 (constant). Additionally, the compensated q-axis current command value |SIQCE| changes as indicated by a solid line SIQCE, and the control angle α at that time becomes as indicated by a curve 52. More specifically, the control angle becomes α=θ2 (constant) for an interval of 0≦|SIDCC|≦SIDC1; changes in inverse proportion to the d-axis current command value (absolute value) |SIDCC| for an interval of SIDC1≦|SIDCC|≦SIDC3; and becomes α=θ1 (constant) for an interval of SIDC3≦|SIDCC|≦SIDCMAX.

An important feature of the present invention is the point that the control angle α becomes constant in the interval of the d-axis current command value (absolute value), the interval 0≦|SIDCC|≦SIDC1, in which the current is especially minute. In this interval, as stated, the reluctance torque becomes small compared to the permanent magnet torque due to the characteristics of the rotor structure or the magnetic material; hence, the torque constant can be further enlarged by enlarging the control angle α and utilizing the permanent magnet torque. The control angle α is held constant in the minute current interval of 0≦|SIDCC|≦SIDC1, and the control is performed with the control angle close to the control angle of a surface magnet type motor, whereby the responsibility of the motor in the minute current mode is enhanced. Here, the control angle α versus the d-axis current command value |SIDCC| does not always agree with the locus of the peak torque appearing for the applied current as illustrated in FIG. 4(a) (the angle θRE indicated by line 41), and the q-axis current compensation value SDLTIQ is set so that a motor torque with preferable linearity to the d-axis current command (absolute value) |SIDCC| (∝ torque command value STC) can be obtained.

Figure 6:
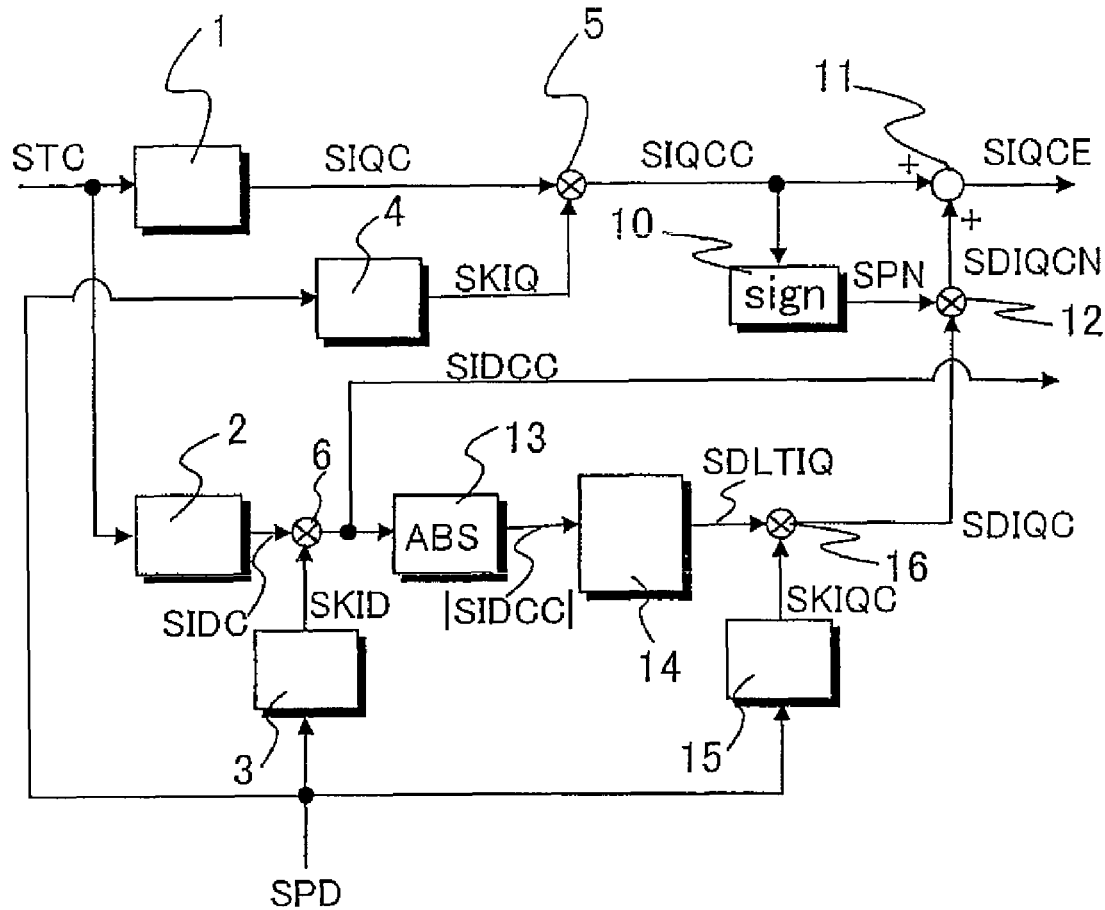
FIG. 6 is an explanatory diagram showing another embodiment of the control apparatus for a motor according to the invention.

FIG. 6 shows another example embodiment of the present invention, in which a q-axis compensation current coefficient calculation unit 15 and a multiplication unit 16 are added to the embodiment in FIG. 1. The q-axis compensation current coefficient calculation unit 15 calculates a q-axis compensation current coefficient SKIQC with reference to the rotor speed SPD, and outputs the calculated coefficient SKIQC to the multiplication unit 16. Additionally, the multiplication unit 16 multiplies the q-axis current compensation value SDLTIQ and the q-axis compensation current coefficient SKIQC, to thereby output a q-axis current compensation value SDIQC.

Figure 7A:
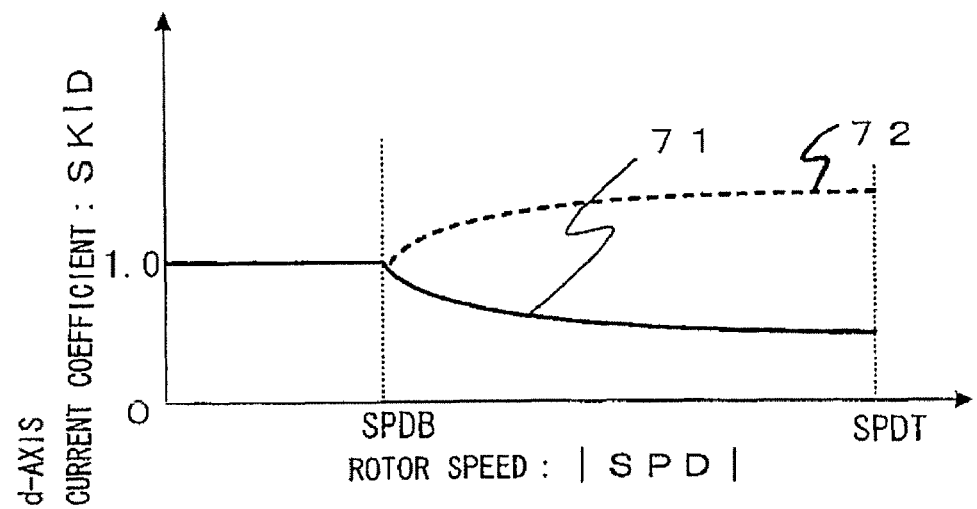
FIGS. 7(a), 7(b) and 7(c) are explanatory diagrams showing a function example of a d-axis current coefficient, a function example of a q-axis current coefficient, and a function example of a q-axis compensation current coefficient as are applied to the control apparatus, respectively.
Figure 7B:
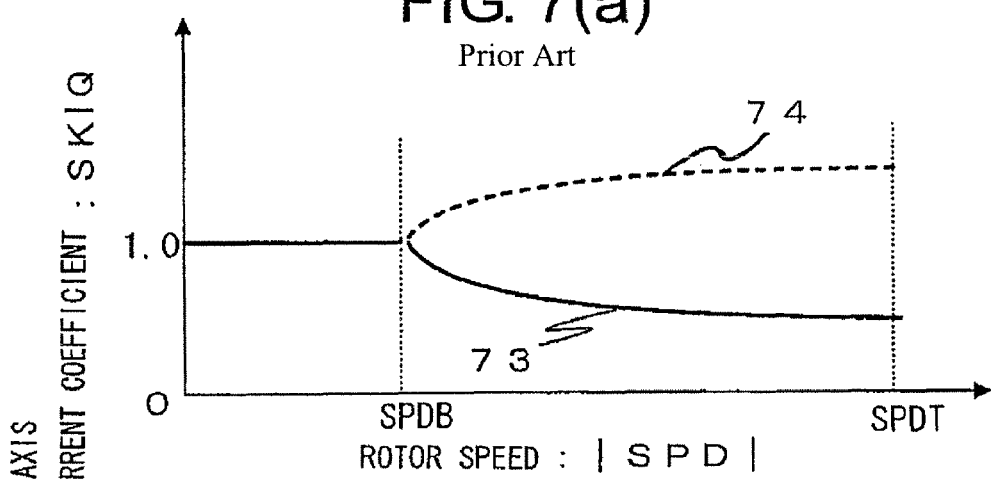
Figure 7C:
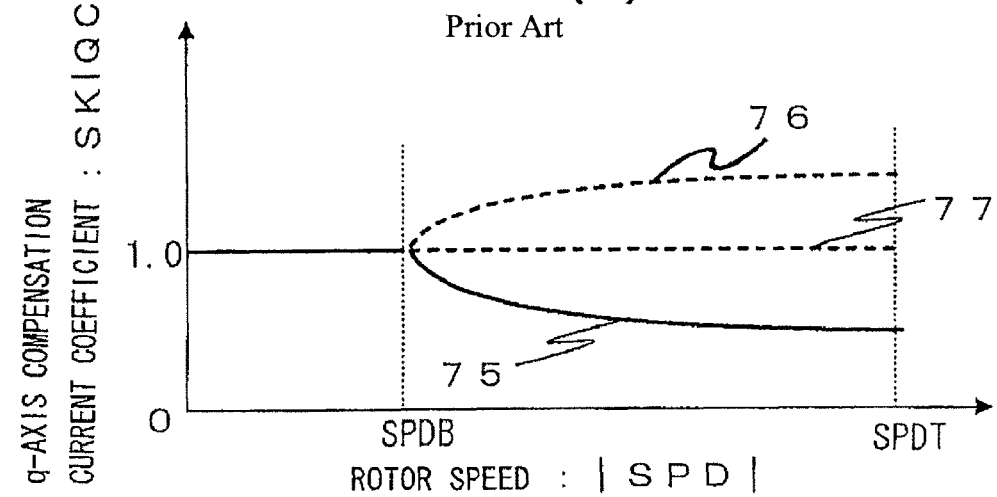

FIGS. 7(a), 7(b), and 7(c) show lines 71 and 72, each being a d-axis current coefficient SKID, versus the absolute value |SPD| of the rotor speed; lines 73 and 74 each being a q-axis current coefficient SKIQ; and lines 75, 76 and 77 each being the change of the q-axis compensation current coefficient SKIQC which forms one feature of the present invention. The respective coefficients normally become "1" below the basic rotation number SPDB. Further, the coefficients change in accordance with the rotation number SPD at the basic rotation number SPDB or above, and in FIGS. 7(a), 7(b), and 7(c), the lines 71, 73, and 75 represent cases where the coefficients become below "1", while lines 72, 74, and 76 represent cases where the coefficients become "1" or greater. The line 77 in FIG. 7(c) represents a case wherein the coefficient SKIQC becomes "1" even at the basic rotation number SPDB or above. The above d-axis current coefficient SKID, q-axis current coefficient SKIQ and q-axis compensation current coefficient SKIQC are determined by the characteristics of the motor, and are primarily adjusted using a desired output adjustment at the basic rotation number SPDB or above or the conditions of a supply voltage. It may also be noted that, although the functions at the basic rotation number SPDB or above are expressed by curves in FIGS. 7(a) to 7(c), the functions are not restricted to the illustrated examples and may, for example, be expressed as straight lines. The q-axis compensation current coefficient SKIQC which is calculated by the q-axis compensation current coefficient calculation unit 15 shown in FIG. 6 relates significantly to the characteristics in FIGS. 7(a) to 7(c), and changes in accordance with the rotation number SPD at the basic rotation number SPDB or above. Calculation examples based on the q-axis compensation current coefficient SKIQC will be indicated below.

Figure 8:
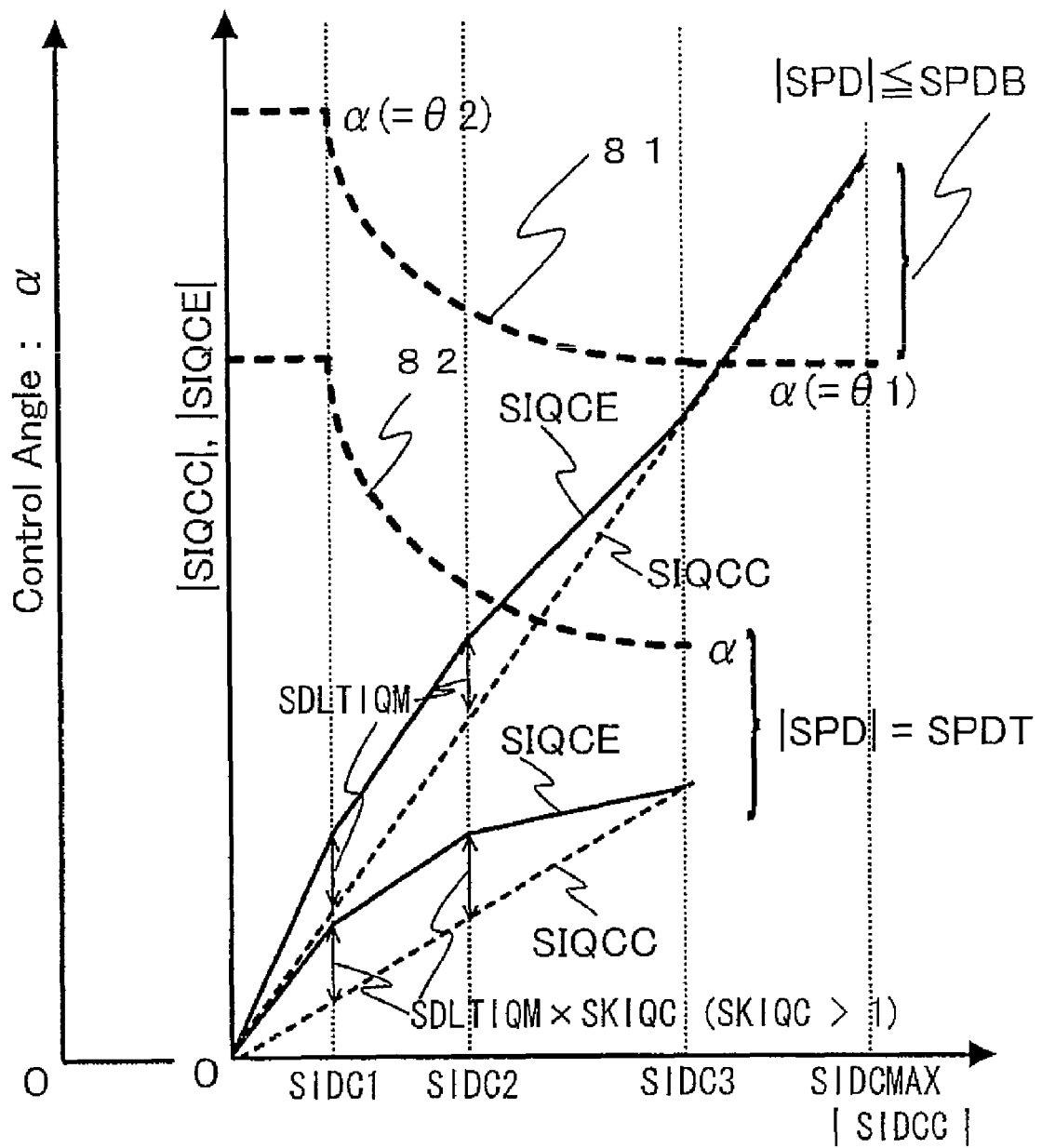
FIG. 8 is an explanatory diagram showing a d-axis current command value, a q-axis compensation current and a control angle as are applied to the control apparatus (an example of a q-axis compensation current value at the highest rotation number)

FIG. 8 also shows a case wherein the rotor speed |SPD| is at the basic rotation number SPDB or above, and a function is as explained below. By way of example, FIG. 8 corresponds to an example wherein the rotor speed |SPD| is at the highest rotation number SPDT, wherein the q-axis compensation current coefficient SKIQC is "1" or larger and the amplitude value of the q-axis current compensation value SDLTIQ is multiplied by the q-axis compensation current coefficient SKIQC. It is a feature that the q-axis compensation current coefficient SKIQC changes from the basic rotation number SPDB to the highest rotation number SPDT of the rotor speed |SPD|.

Figure 9:
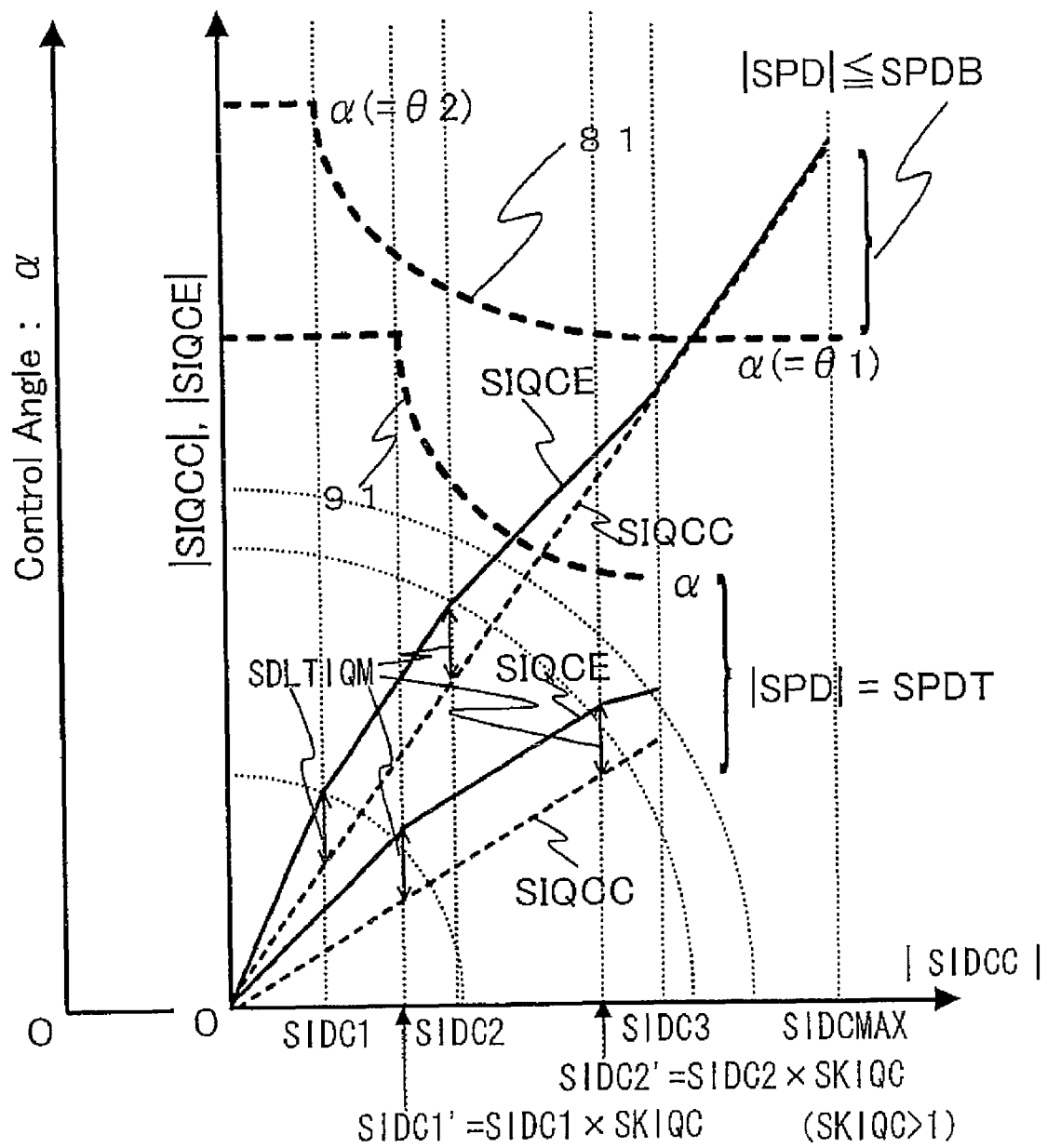
FIG. 9 is an explanatory diagram showing a d-axis current command value, a q-axis compensation current and a control angle as are applied to the control apparatus (another example of a q-axis compensation current value at the highest rotation number)

FIG. 9 shows another example for explaining a function in an example wherein the rotor speed |SPD| is at the basic rotation number or above. FIG. 9 corresponds to a an example wherein the q-axis compensation current coefficient SKIQC is "1" or larger and the threshold values SIDC1, SIDC2 and SIDC3 of the respective d-axis current command values are multiplied by the q-axis compensation current coefficient SKIQC. The example illustrated in FIG. 8 and the example illustrated in FIG. 9 may be selected as appropriate in consideration of the characteristics of the motor. Obviously, the two examples shown in FIGS. 8 and 9 may also be combined. In such a case, the respective q-axis compensation current coefficients SKIQC (SKIQC1 and SKIQC2) are calculated by the q-axis compensation current coefficient calculation unit 15.

As described above, when any of the embodiments of the present invention are employed, the control apparatus for the reluctance type synchronous motor compensates a q-axis current command by a trapezoidal function or a triangular function and can improve a nonlinear current-torque characteristic ascribable to the magnetic structure of the motor rotor and the magnetic characteristic of the material thereof. It is therefore possible to obtain a torque proportional to a torque command value, and to obtain the control apparatus for the motor having a stable controllability. It should also be noted that although each of the examples used to illustrate the embodiments describes control performed using a trapezoidal or triangular function, it is obvious that the q-axis current command can be appropriately processed using a function of a polygon having any larger number of sides.

What is claimed is:

1. A control apparatus for a reluctance type synchronous motor wherein slit-shaped gaps or a nonmagnetic material are included within a rotor to provide level differences of the magnetic reluctance in a rotating direction, and a permanent magnet is included at a portion of the slit-shaped gaps or the nonmagnetic material to provide magnetic polarities at a rotor surface, comprising:

a q-axis current calculation unit which calculates a q-axis current amplitude value that is proportional to a torque command value given by a host controller;

a d-axis current calculation unit which calculates a d-axis current amplitude value that is proportional to the torque command value;

a speed coefficient calculation unit which calculates a q-axis current coefficient and a d-axis current coefficient that change in accordance with a rotor speed;

a q-axis current compensation value calculation unit which calculates a q-axis current command value and a d-axis current command value by multiplying the q-axis current amplitude value and the q-axis current coefficient, and the d-axis current amplitude value and the d-axis current coefficient, respectively, and which calculates a q-axis current compensation value in conformity with a triangular compensation function or a trapezoidal compensation function based on the d-axis current command value; and an output unit which outputs a compensated q-axis current command value in which the calculated q-axis current compensation value is added to the q-axis current command value.

2. A control apparatus for a reluctance type synchronous motor as defined in claim 1, wherein the triangular compensation function is a function of an absolute value of the d-axis current command value, in which:

the q-axis current compensation value increases when 0<|the d-axis current command value|≦a first threshold value; and the q-axis current compensation value decreases when the first threshold value<|the d-axis current command value|≦a second threshold value, and wherein the threshold values are set such that 0<the first threshold value<the second threshold value.

3. A control apparatus for a reluctance type synchronous motor as defined in claim 1, wherein the trapezoidal compensation function is a function of an absolute value of the d-axis current command value, in which:

the q-axis current compensation value increases when 0<|the d-axis current command value|≦a first threshold value;

the q-axis current compensation value is constant when the first threshold value<|the d-axis current command value|≦a second threshold value; and the q-axis current compensation value decreases when the second threshold value<|the d-axis current command value|≦a third threshold value, and in which the threshold values are set such that 0<the first threshold value<the second threshold value<the third threshold value.

4. A control apparatus for a reluctance type synchronous motor as defined in any of claim 1, wherein the q-axis current compensation value is calculated by multiplying the q-axis current compensation value and an increase/decrease coefficient which is calculated by an increase/decrease coefficient calculation unit with reference to the rotor speed, at a basic rotation number or above.

5. A control apparatus for a reluctance type synchronous motor as defined in any of claim 1, wherein the q-axis compensation current value changes the threshold value of the absolute value of the d-axis current command value by multiplying a coefficient which is calculated in accordance with the rotor speed.

* * * * *